(12) United States Patent
Jin et al.

(10) Patent No.: US 12,433,844 B2
(45) Date of Patent: Oct. 7, 2025

(54) PREPARATION METHOD AND APPLICATION OF TUMOR MICROPARTICLES ENCAPSULATING METABOLIC INHIBITORS

(71) Applicant: Union Hospital, Tongji Medical College, Huazhong University of Science and Technology, Wuhan (CN)

(72) Inventors: Yang Jin, Wuhan (CN); WenJuan Chen, Wuhan (CN); Qi Tan, Wuhan (CN); JingJing Deng, Wuhan (CN)

(73) Assignee: Union Hospital, Tongji Medical College, Huazhong University of Science and Technology, Wuhan (CN)

( * ) Notice: Subject to any disclaimer, the term of this patent is extended or adjusted under 35 U.S.C. 154(b) by 319 days.

(21) Appl. No.: 18/321,613

(22) Filed: May 22, 2023

(65) Prior Publication Data
US 2023/0381110 A1  Nov. 30, 2023

Related U.S. Application Data

(63) Continuation of application No. PCT/CN2023/088241, filed on Apr. 14, 2023.

(30) Foreign Application Priority Data

May 26, 2022 (CN) .......................... 202210590641.1

(51) Int. Cl.
*A61K 9/50* (2006.01)
*A61K 9/48* (2006.01)
*A61K 31/405* (2006.01)
*C12N 5/09* (2010.01)

(52) U.S. Cl.
CPC .......... *A61K 9/5068* (2013.01); *A61K 9/4833* (2013.01); *A61K 31/405* (2013.01); *C12N 5/0693* (2013.01); *C12N 2529/10* (2013.01)

(58) Field of Classification Search
CPC .. A61K 9/5068; A61K 9/4833; A61K 31/405; C12N 5/0693; C12N 2529/10
See application file for complete search history.

*Primary Examiner* — Robert A Wax
*Assistant Examiner* — John W Lippert, III
(74) *Attorney, Agent, or Firm* — Hemisphere Law, PLLC; Zhigang Ma

(57) ABSTRACT

A preparation method of a tumor microparticle encapsulating a metabolic inhibitor includes following steps. A tumor cell is cultivated, and a statin drug is added to a culture medium after the tumor cell grows stably. Then, the tumor cell is irradiated with an ultraviolet, and then the tumor cell is incubated in a cell incubator for 22~26 hours. After the incubation, cell supernatant is collected and the tumor microparticle encapsulating the metabolic inhibitor is obtained through a gradient centrifugation. The preparation method uses tumor cell-derived microparticles as drug delivery platforms, with a simple preparation process that preserves functions such as biosafety, biocompatibility, targeting, and intercellular communication. The preparation method discovers new uses of a statin drug, which can inhibit tumor growths with the statin drug, regulate tumors metabolism and improve a tumor microenvironment, and have a potential to enhance a chemotherapy efficacy and delay a chemotherapy resistance.

7 Claims, 15 Drawing Sheets

PREPARATION METHOD AND APPLICATION OF TUMOR MICROPARTICLES ENCAPSULATING METABOLIC INHIBITORS

CROSS-REFERENCE TO RELATED APPLICATION

The application claims priority to Chinese patent application No. 202210590641.1, filed on May 26, 2022, and titled with "PREPARATION METHOD AND APPLICATION OF TUMOR MICROPARTICLES ENCAPSULATING METABOLIC INHIBITORS", and the entire contents of the above-mentioned application are hereby incorporated herein by reference.

TECHNICAL FIELD

The disclosure relates to the field of biopharmaceutical technology, in particular to a preparation method of a tumor microparticle encapsulating a metabolic inhibitor and an application of the tumor microparticle encapsulating the metabolic inhibitor.

BACKGROUND

Extracellular vesicles (EVs) are membranes derived vesicles released by cells into an extracellular space, playing an important role in an intercellular communication to regulate physiological and pathological processes. The EVs shed during cell germination are further called microparticles (MPs), with a size range of 150~1000 nanometer (nm).

Tumor cell-derived microparticles (TMPs) accelerate a tumor growth and metastasis through the intercellular communication, and mediate the generation of an immunosuppressive tumor microenvironment (TME). In addition, the TMPs are served as targeted delivery carriers for transporting any one of a small molecule compound, a lipid, a protein, and a nucleic acid. Therapeutic advantages of the TMPs are as follows: (1) a low immunogenicity; (2) a reducing toxic side effect of autologous TMPs, compared to synthesized nanoparticles; (3) a targeted cell delivery of goods; and (4) a good cell membrane fusion. Due to the advantages of the TMPs, many academic teams and companies are now committed to developing cancer treatment methods based on the TMPs.

As early as 2019, our team developed autologous tumor cell-derived microparticles encapsulating methotrexate (TMP-MTX) for a treatment of patients with an advanced lung cancer and a malignant pleural effusion, which have achieved certain results. The relevant results have been published in Science Translational Medicine. At present, methods for loading therapeutic goods into the TMPs include: (1) before extracting the autocrine TMPs, cells overexpress goods such as a target protein, miRNA, etc.; (2) physical methods are used, such as an electroporation, to increase a membrane permeability; and (3) after a chemical treatment, such as a co incubation, the TMPs are encapsulated with the goods such as siRNA and the small molecule compound.

In addition, our team studied metabolomics of the EVs in a benign pleural effusion and the malignant pleural effusion and found differences in a glucose metabolism, an amino acid metabolism, and a lipid metabolism. Relevant results have been published in Journal of Extracellular Vehicles. Many studies have used a tumor metabolism as a breakthrough point to explore new treatment strategies. As is well known, the glucose metabolism in a cancer cell is active, especially an aerobic glycolysis, known as a "Warburg effect". A metabolite of the glucose: a lactic acid is constantly produced during a metabolic process of tumor cells. An excessive accumulation of the lactic acid causes acidification of an intracellular environment and damages cells viability. In addition, the acidification of the TME promotes an invasion and a metastasis of immune cells, and also weakens an anti-tumor function of the immune cells. Therefore, inhibiting a lactate transport is one of the treatment strategies for the cancer, which causes acidification deaths of the cancer cells and regulate a tumor immune microenvironment meanwhile. Monocarboxylic acid transporters (MCTs) continue to operate as major lactate transport proteins to balance an intracellular lactate environment and an extracellular lactate environment. In the MCTs family, the MCT4 is highly expressed in multiple cancer species, mainly transporting the lactate from glycolytic cells to extracellular spaces. The MCT4 is associated with a poor prognosis in cancer patients such as a liver cancer, a prostate cancer, and a lung cancer. For a long time, the MCT4 has been a research goal in a field of a tumor therapy, and knocking out an expression of the MCT4 in the tumors has satisfactory anti-tumor effects. In the past two years, researchers have prepared nanomaterials encapsulated with siMCT4 (the siMCT4 is small interfering RNA that inhibits the expression of MCT4) and applied the siMCT4 to a treatment of a breast cancer and other cancers at an animal level.

A statin drug, as a well-known lipid metabolism inhibitor, is commonly a used drug in a cardiovascular system to prevent adverse cardiovascular events such as a myocardial infarction. According to reports, a statin drug therapy causes symptomatic adverse reactions such as a muscle pain or a weakness in 0.5% to 1.0% of patients. Multiple clinical studies have explored the statin drug and concluded that a use of the statin drug has a positive effect in a fight against the cancer, such as reducing an incidence of the cancer and prolonging a survival of the cancer patients. However, a statin metabolic inhibitor has not been included in a cancer prevention and a treatment guideline, indicating that an effectiveness of the statin drug alone in inhibiting the tumor growth is limited.

An inhibition of a MCT4 protein is intervened by a use of various drugs such as anyone of siRNA, VB124, CB-2M, CHC, and the other small molecules, which have not yet been approved by Food and Drug Administration (FDA) for a clinical use, and the toxic side effect on humans is still unknown. At present, one of the small interfering RNA and a newly discovered small molecule compound is chosen as the metabolic inhibitor of the MCT4 encapsulated on the EVs or synthetic nanomaterials. Although effective at the animal level, the metabolic inhibitors are currently not suitable for the use in the humans, and a clinical applicability of the metabolic inhibitors is still unknown. The unknown clinical applicability leads to a need for the nanomaterials encapsulated with non-clinical drugs to face repeated and lengthy clinical trials and an ethical verification during a clinical conversion process.

Compared to researches on the MPs encapsulating the drugs, it is more common to study effects of engineered nanomaterials encapsulating metabolic pathway inhibitors on the tumors. Although nanoparticles that are not MPs appeared earlier and are studied more, the EVs or the MPs have more prominent advantages. The MPs contain a large amount of information about their own bodies. For example, the TMPs are rich in tumor antigens, have an innate ability to activate or evade a tumor immune response. Based on the TMPs containing the large amount of the information about their own bodies, the TMPs are used as tumor vaccines. However, the synthetic nanoparticles such as gold nanoparticles, lack information such as cell proteins and the RNA, making the synthetic nanoparticles more easily recognized by the body as foreign objects. Additionally, a biological safety is unknown, a preparation process is complex, and costs are high.

An acquired drug resistance and the toxic side effects brought about by a traditional chemotherapy make the patients suffer unbearably, and even lead to a malignant progression and a shortened survival. Nowadays, a large number of research teams are eager to seek the breakthrough in chemotherapy strategies through the EVs. However, the studies have shown that the chemotherapy stimulates a secretion of the EVs by the cells, inducing the cancer cells to develop into drug-resistant subtypes during a process of the intercellular communication. Although many of the studies have confirmed that the simple EVs combined with the chemotherapy or the EVs encapsulated chemotherapy drugs inhibit cancer growths, considering that therapeutic effects of the chemotherapy induced the drug resistance is greatly compromised, the strategy is not a temporary solution in future.

SUMMARY

A technical problem to be solved in the disclosure is that, considering above issues, a preparation method of a tumor microparticle encapsulating a metabolic inhibitor and an application of the tumor microparticle encapsulating the metabolic inhibitor are proposed. The following technical solutions are adopted in the disclosure:

The preparation method of the tumor microparticle encapsulating the metabolic inhibitor includes the following steps:
step 1, a tumor cell is cultivated, and a statin drug is added to a culture medium after the tumor cell grows stably;
step 2, the tumor cell is irradiated with an ultraviolet (UV), and then the tumor cell is incubated in a cell incubator for 22~26 hours (h); and
step 3, after the incubation, cell supernatant is collected and the tumor microparticle encapsulating the metabolic inhibitor is obtained through a gradient centrifugation.

In an embodiment, in step 1, 0.2 millimoles per liter (mmol/L) Fluvastatin as the statin drug are added to every $10^8$ numbers of the tumor cell.

In an embodiment, a UV irradiation time in step 2 is 20 minutes (min).

In an embodiment, an incubation time in step 2 is 24 h.

The tumor microparticle encapsulating the metabolic inhibitor is prepared using the preparation method of the tumor microparticle encapsulating the metabolic inhibitor.

The application of the tumor microparticles encapsulating the metabolic inhibitor in a treatment of a cancer. In an embodiment, the tumor microparticles encapsulating the metabolic inhibitor is applied to prepare an injection reagent for inhibiting tumor growth.

After adopting the technical solutions, the disclosure has three advantages compared to the related art.
1. The preparation method of the disclosure is simple by using the TMPs as drug delivery platforms, and functions such as biosafety, biocompatibility, targeting, and intercellular communication are preserved.
2. The TMPs encapsulate widely used the metabolic inhibitor in clinic, i.e., the statin drug, thereby discovering new uses of the statin drug to inhibit the tumor growths, regulate the tumor metabolism and improve a tumor microenvironment (TME) with very low doses of the drugs.
3. The TMPs encapsulating the metabolic inhibitor such as the statin drug have a potential to enhance a chemotherapy efficacy and delay a chemotherapy resistance.

BRIEF DESCRIPTION OF DRAWINGS

In order to illustrate embodiments of the disclosure or technical solutions in the related art more clearly, a brief introduction is made to drawings needed in the embodiments below. Apparently, the drawings described below are only some of the embodiments of the disclosure. For those skilled in the art, other drawings are obtained from the drawings needed in the embodiments below without any creative effort.

FIG. 6B shows percentage of apoptotic cells, FIG. 6C shows cell viability. In FIGS. 6B and 6C, Control represents no external stimulation of the LLC cells, Flu represents the LLC stimulated by the Flu (the concentration is equivalent to the Flu content in the TMP-F) for 24 hours (h); TMP-0 represents the LLC stimulated by the empty TMPs (TMP-0) for 24 h; TMP-F represents the LLC stimulated by the TMPs encapsulating the drugs (TMP-F) for 24 h; and ns is not statistically significant, *P<0.05, P<0.01, *P<0.001, **P<0.001.

DETAILED DESCRIPTION OF EMBODIMENTS

The following is a description of principles and features of the disclosure in conjunction with accompanying drawings. Embodiments provided are only intended to explain the disclosure and are not intended to limit its scope.

1. Preparing a Tumor Cell-Derived Microparticle (TMP) Encapsulating a Metabolic Inhibitor Such as Fluvastatin (TMP-F)

Figure 1:
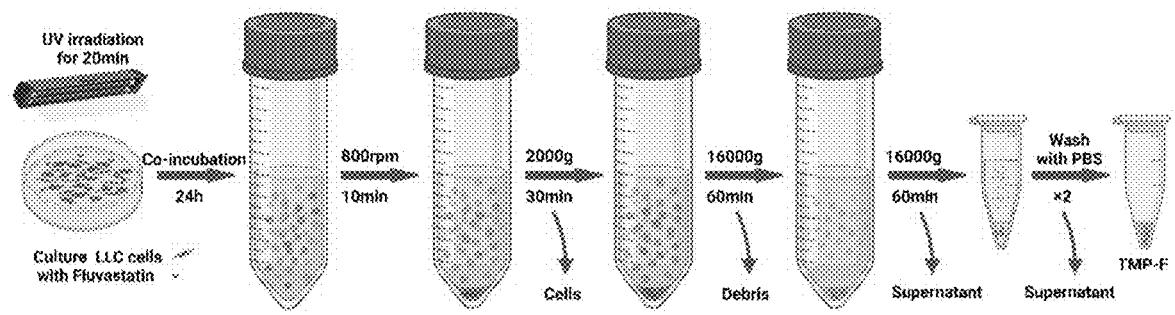
FIG. 1 is a schematic diagram of a preparation process of a tumor microparticle encapsulating a metabolic inhibitor such as Fluvastatin (TMP-F).

After the Lewis lung carcinoma (LLC) cell (lung adenocarcinoma cell lines) grows stably, 0.2 millimoles per liter (mM) Fluvastatin is added to a culture medium. Subsequently, the LLC cell is irradiated with an ultraviolet (300 joules per square meter ($Jm^{-2}$)) for 20 minutes (min), and then incubated in a cell incubator for 24 hours (h). After the 24 h, cell supernatant is collected, and the TMP-F is obtained by a gradient centrifugation. Specifically, the gradient centrifugation is performed on the cell supernatant at 800 revolutions per minute (rpm) for 10 min, and then the cell precipitate is discarded to obtain first cell supernatant, the gradient centrifugation is performed on the first cell supernatant at a relative centrifuge force of 2000×g (the unit for g is gravitational acceleration, i.e., 9.8 m/$s^2$) for 30 min, and then the cell debris is discarded to obtain second cell supernatant. The gradient centrifugation is performed on the second cell supernatant at a relative centrifuge force of 16000×g for 60 min to obtain the precipitate (i.e., the supernatant is discarded), the obtained precipitate is the TMP-F. Finally, the TMP-F is cleaned twice with phosphate buffered saline (PBS) and stored at −80° C. (FIG. 1).

2. Identifying the TMP-F
2.1 A Size of the TMP-F

Figure 2:
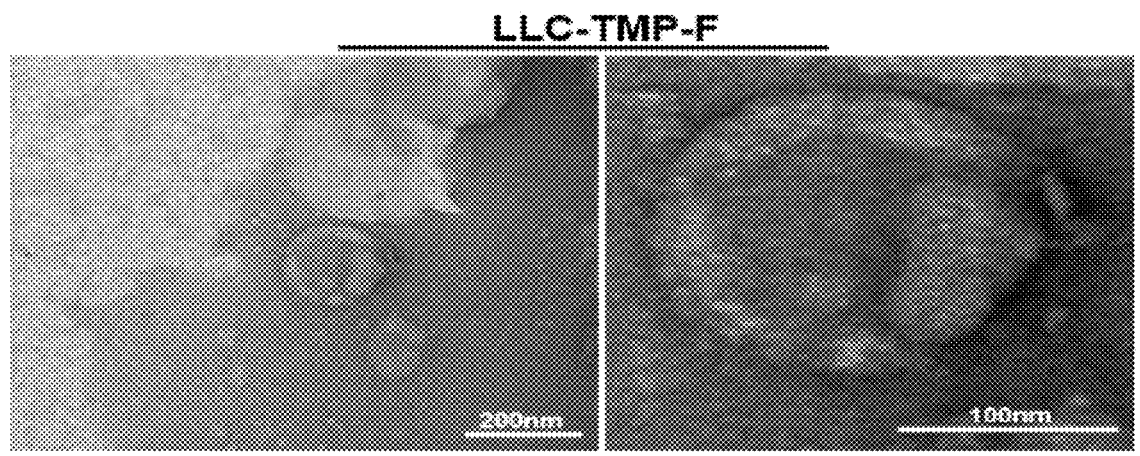
FIG. 2 is a schematic diagram of a transmission electron microscope image of the TMP-F.
Figure 3A:
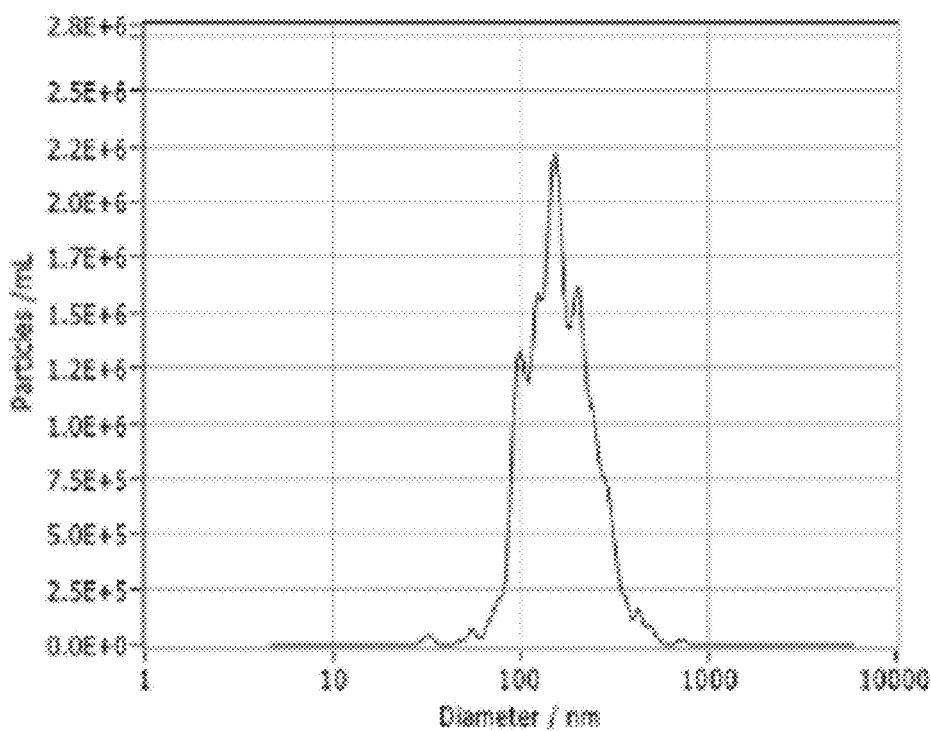
FIG. 3A is a schematic diagram of a size distribution of the TMP-F.
Figure 3B:
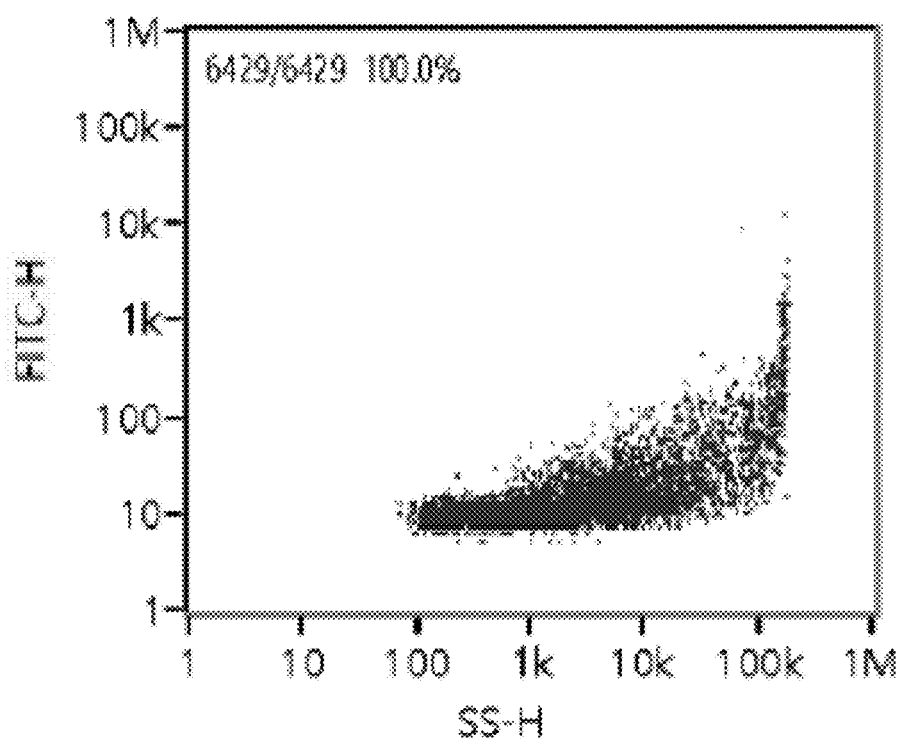
FIG. 3B is a schematic diagram of a particle concentration of the TMP-F.

The TMP-F is identified by a transmission electron microscopy, a nanoparticle tracking analysis (NTA), and a nanoflow cytometry to determine a shape, the size, and extraction concentration of the TMP-F (FIGS. 2, 3A and 3B). The average particle size of the TMP-F is 154.2 nanometers (nm), with the concentration of $2.75 \times 10^{10}$ particles per milliliter (particles/ml).

2.2 Membrane Marking of the TMP-F

Figure 4:
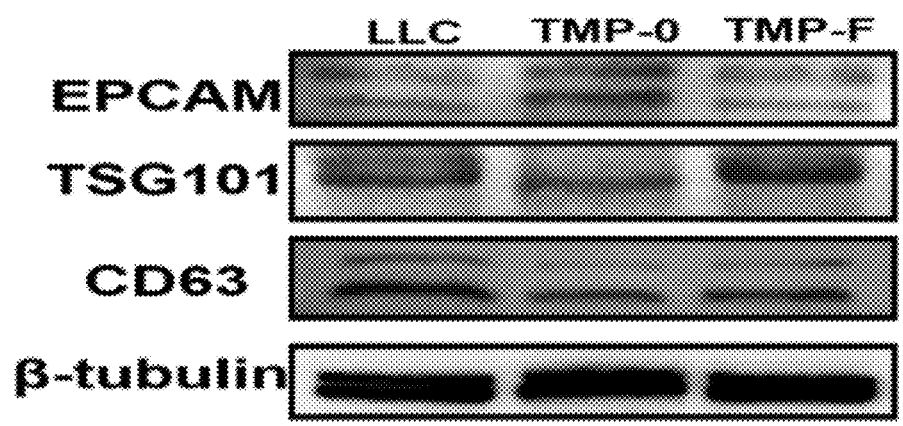
FIG. 4 is a schematic diagram of an expression result of tumor cell-derived microparticles (TMPs) related membrane markers in western blotting (WB).

Epithelial cellular adhesion molecule (EPCAM), tumor susceptibility gene 101 protein (TSG101) and CD63 are classic tumor-derived microparticle marker proteins, β-Tubulin is an internal reference protein, and the western blotting indicates that the TMP-F expresses the above proteins, successfully extracting the TMPs (FIG. 4).

2.3 A Drug Loading Capacity of the TMP-F

Figure 5A:
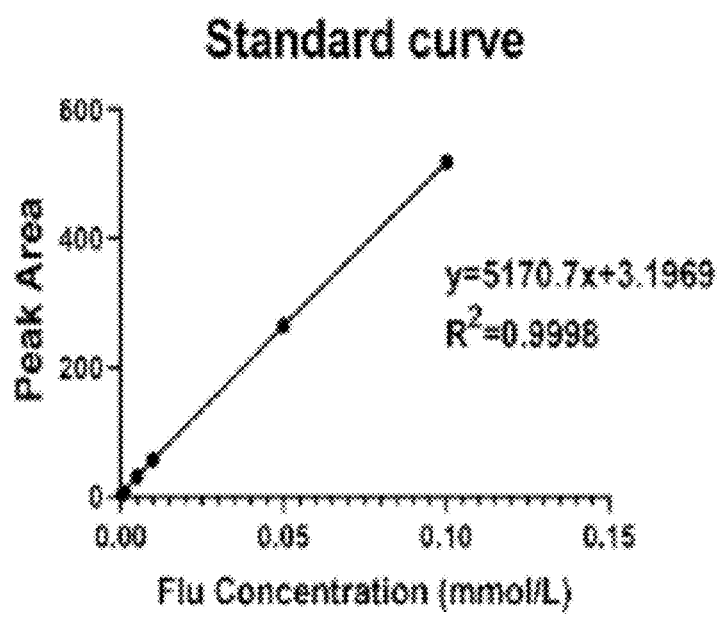
FIG. 5A is a schematic diagram of a standard curve of the Fluvastatin detected by high performance liquid chromatography (HPLC).
Figure 5B:
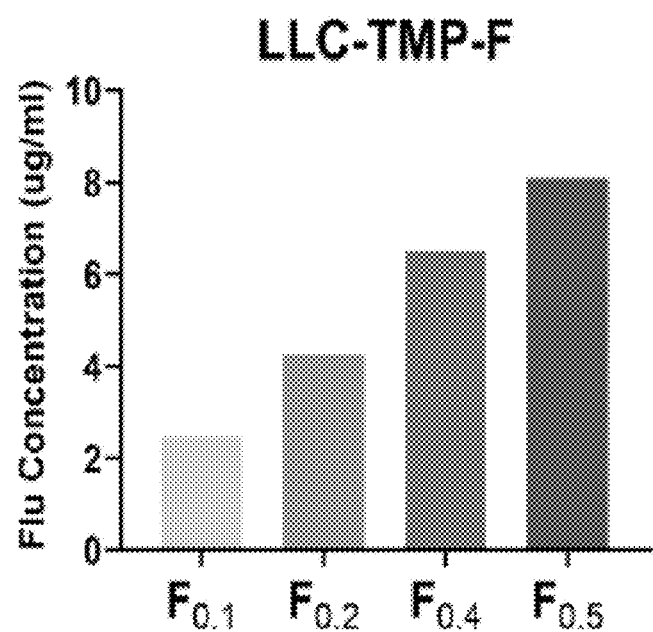
FIG. 5B is a schematic diagram of a drug content in the TMP-F, $F_{0.1}$, $F_{0.2}$, $F_{0.4}$, and $F_{0.5}$ represent the TMP-F induced by Lewis lung carcinoma (LLC) cells stimulated by 0.1 millimoles per liter (mM), 0.2 mM, 0.4 mM, and 0.5 mM Flu, respectively.

To identify the content of the drug encapsulated by the TMP-F, a high performance liquid chromatography (HPLC) is used to infer that the TMP-F secreted by the LLC cell stimulated by the 0.2 mM Fluvastatin (Flu) contains about 4.25 micrograms per milliliter (μg/ml) drug (FIGS. 5A and 5B).

3. The TMP-F Inhibits Cancer Cell Proliferation at a Cellular Level

Figure 6A:
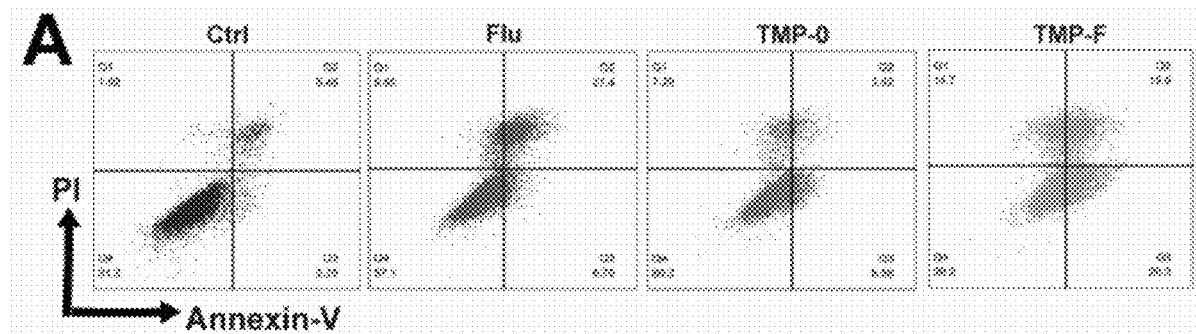
FIG. 6A is a schematic diagram of a flow cytometry result of a cell apoptosis experiment.
Figure 6B:
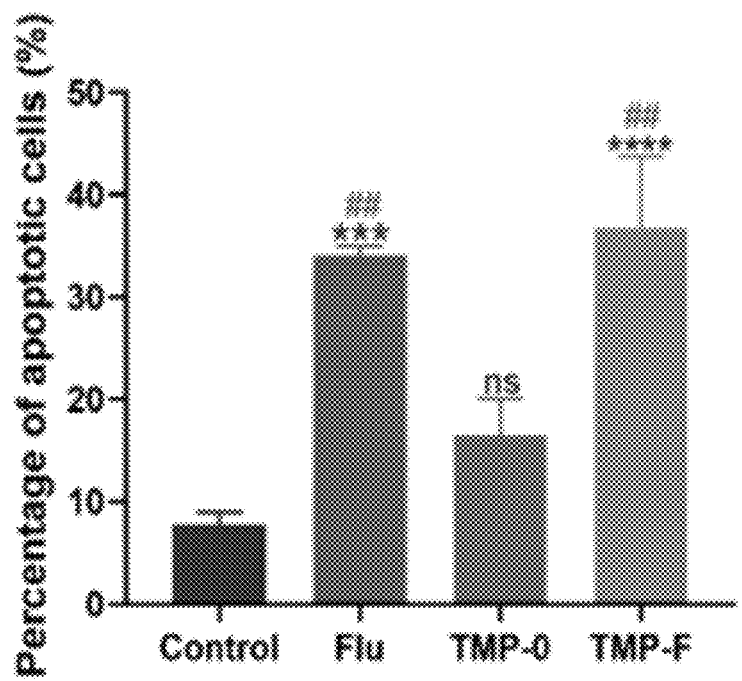
FIGS. 6B and 6C are schematic diagrams showing cell proliferation detected by cell counting kit-8 (CCK8)
Figure 6C:
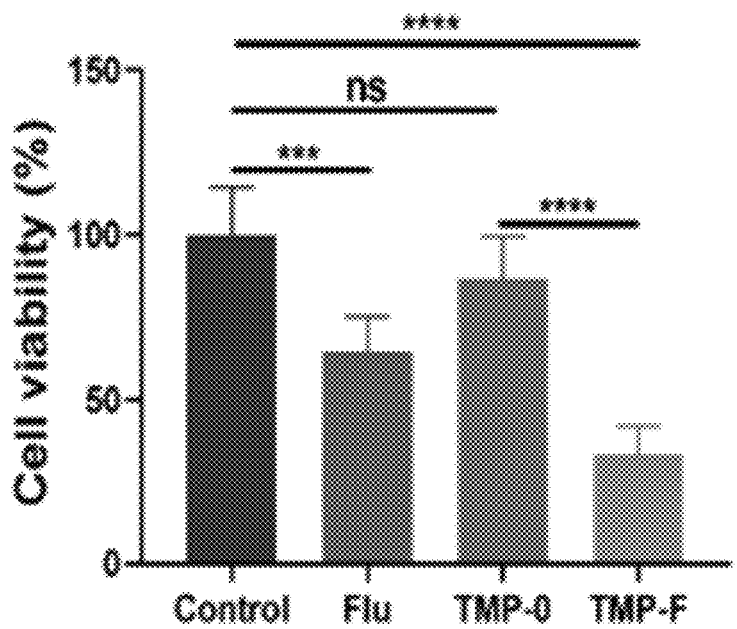

To verify the effect of the TMP-F on lung adenocarcinoma, experiments were first conducted at the cellular level. Results of cell apoptosis and the CCK8 experiment suggest that the TMP-F significantly inhibits the cell proliferation and induces cancer cell apoptosis (FIGS. 6A, 6B and 6C).

4. The TMP-F Inhibits Tumor Growth at an Animal Level

Figure 7A:
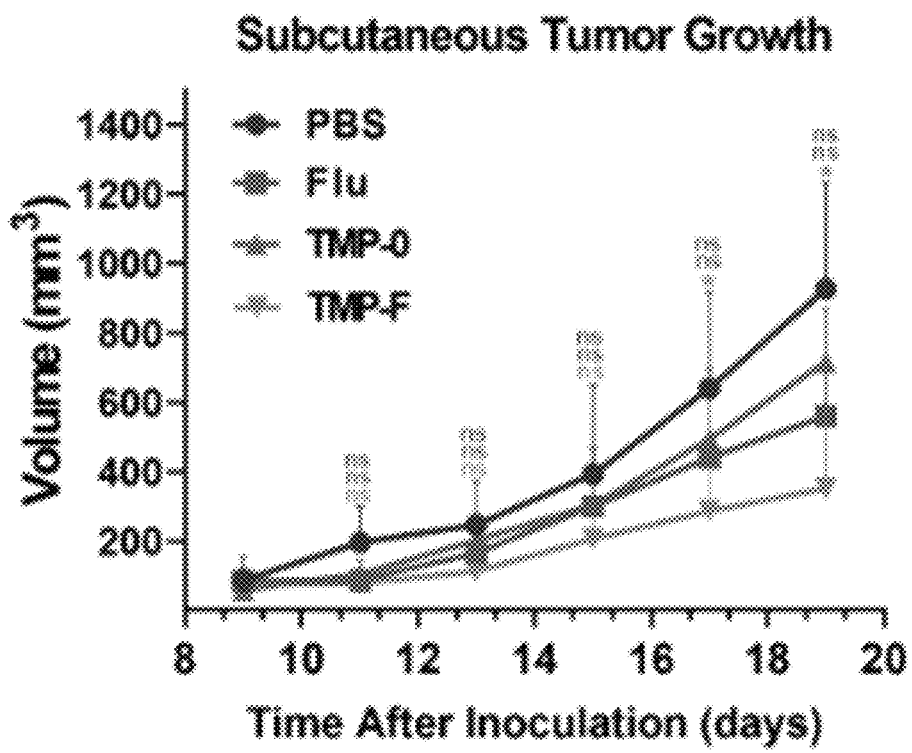
FIG. 7A is a schematic diagram of a volume change curve of subcutaneous tumors of mice.
Figure 7B:
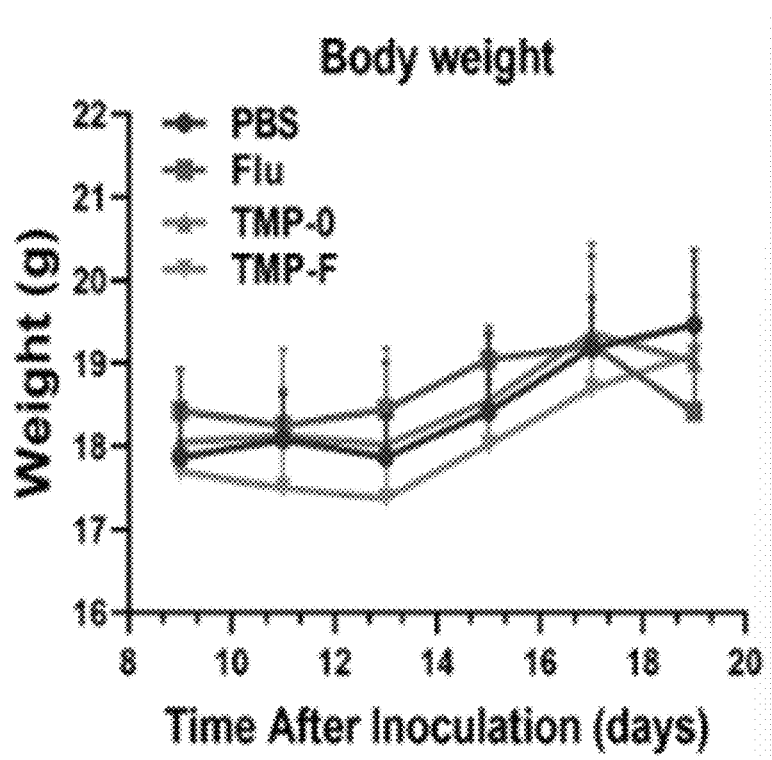
FIG. 7B is a schematic diagram of a weight change of the mice.
Figure 8:
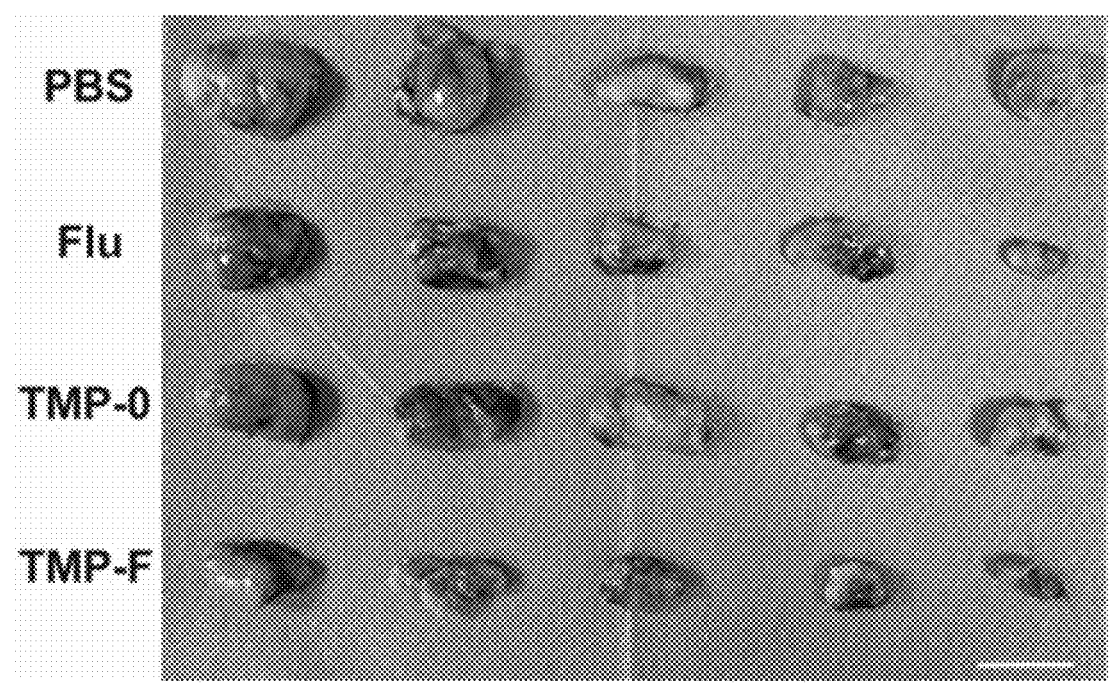
FIG. 8 is a schematic diagram of a display of nude tumors of the mice.
Figure 9A:
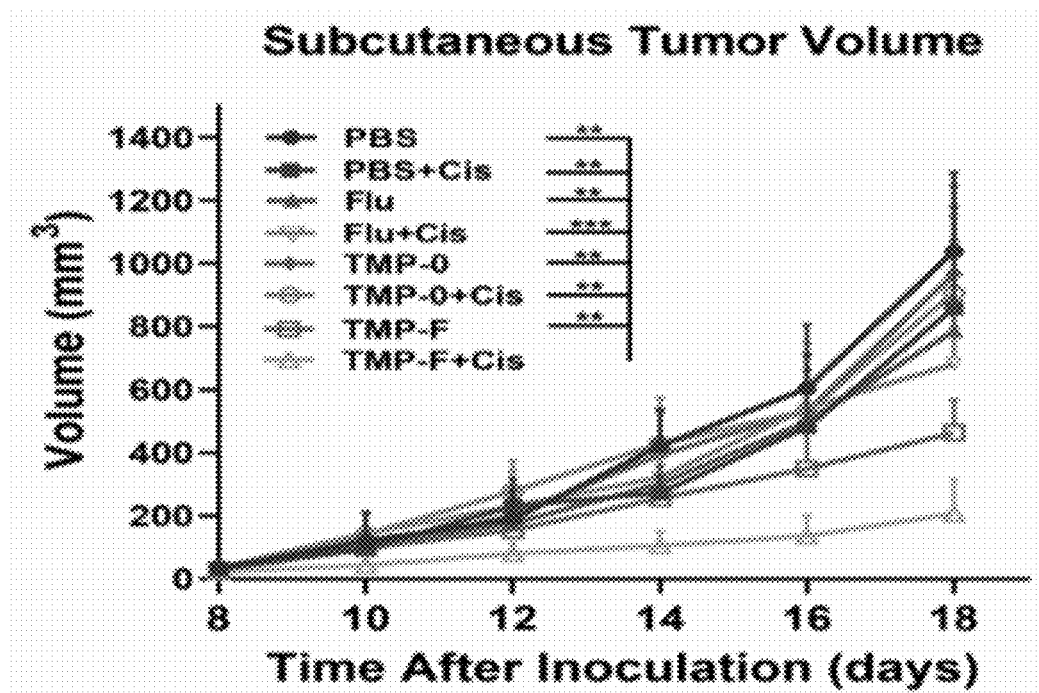
FIG. 9A is a schematic diagram of a volume change curve of the subcutaneous tumors during an intervention period.
Figure 9B:
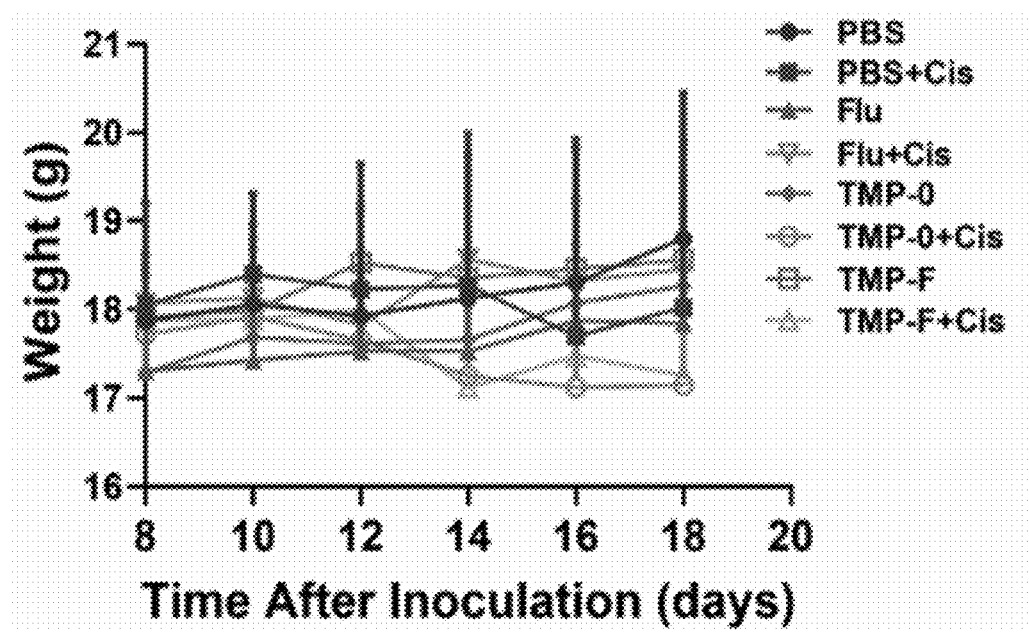
FIG. 9B is a schematic diagram of a weight change of the mice during the intervention period.
Figure 10A:
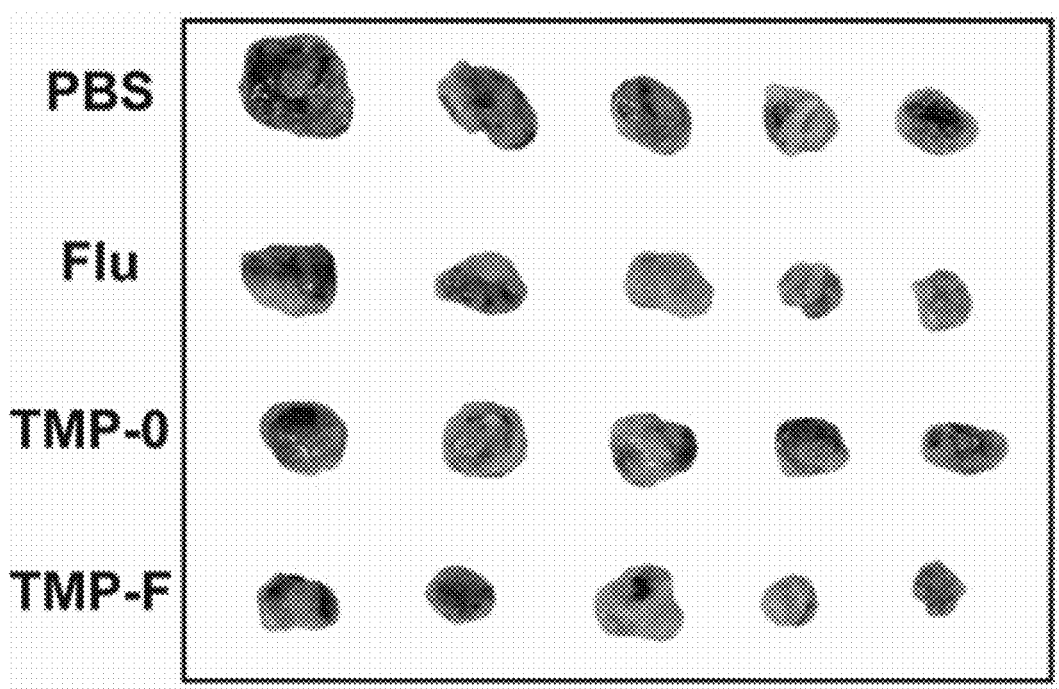
FIG. 10A is a first schematic diagram showing the nude tumors in the mice.
Figure 10B:
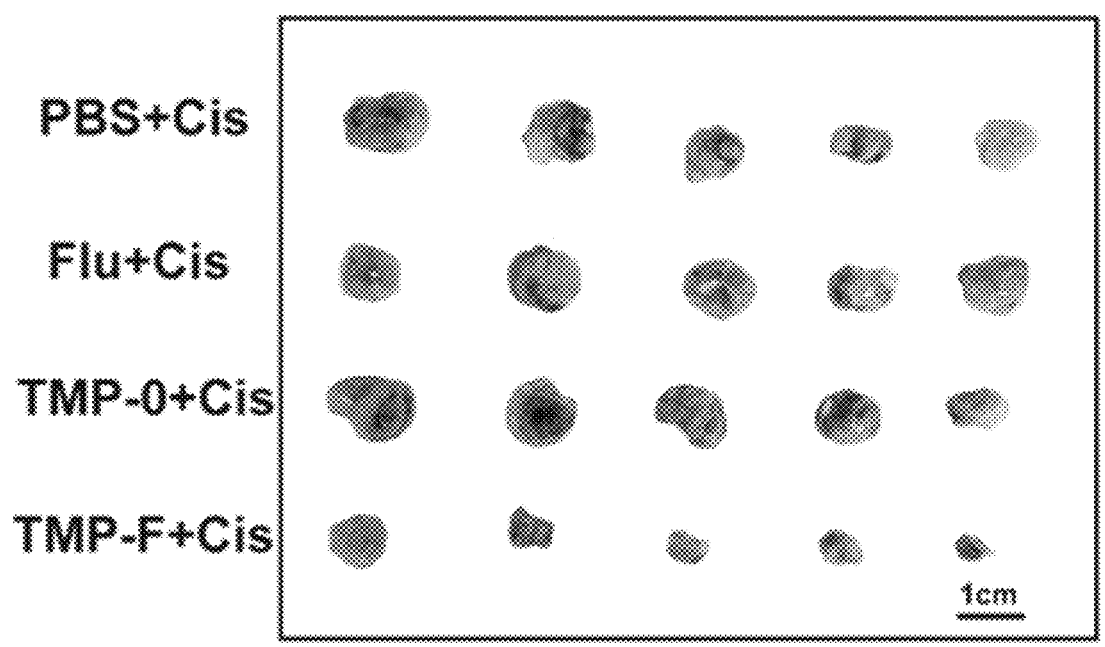
FIG. 10B is a second schematic diagram showing the nude tumors in the mice.

At the animal level, lung adenocarcinoma (LLC cell line) subcutaneous tumors are inoculated on right shoulder backs of C57BL/6 mice. After the growth volume of the subcutaneous tumors reaches 50 cubic millimeters ($mm^3$), interventions are beginning. The mice are randomly divided into 4 groups, with the 5 mice in each group. The results show that the TMP-F group has a significant inhibitory effect on the tumor growth, but compared to a PBS group, administering a same dose of Flu drug in the TMP-F does not achieve the ideal tumor inhibitory effect (FIGS. 7A and 7B). After the 5 times of the interventions, the subcutaneous tumors obtained from dissection are shown in FIG. 8.

Figure 11:
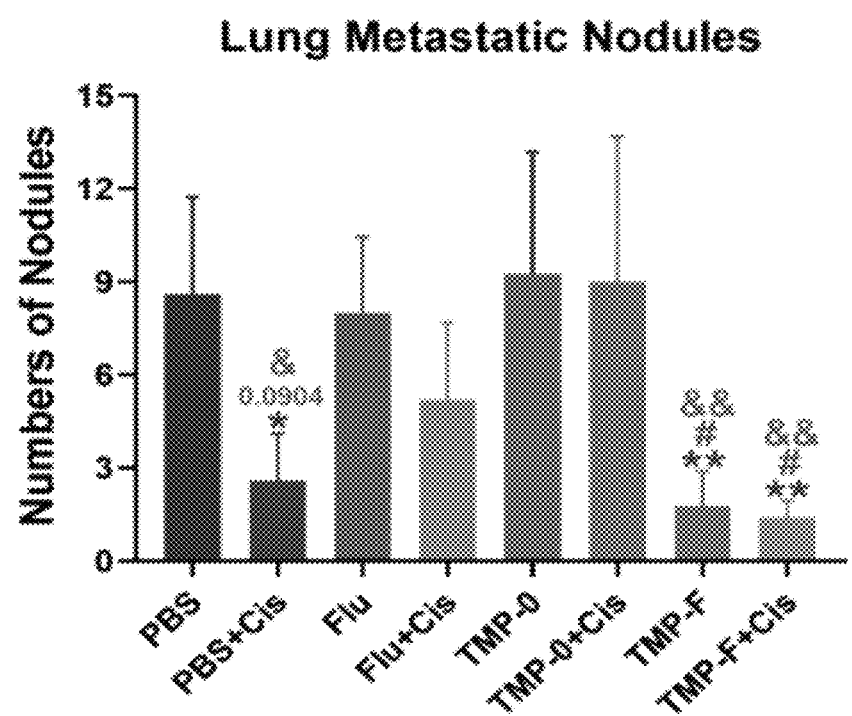
FIG. 11 is a schematic diagram of a statistical map of pulmonary metastatic nodules, and *, #, and & respectively represent a statistical significance after comparison with phosphate buffered saline (PBS), the Flu, and the TMP-0 groups.
Figure 12A:
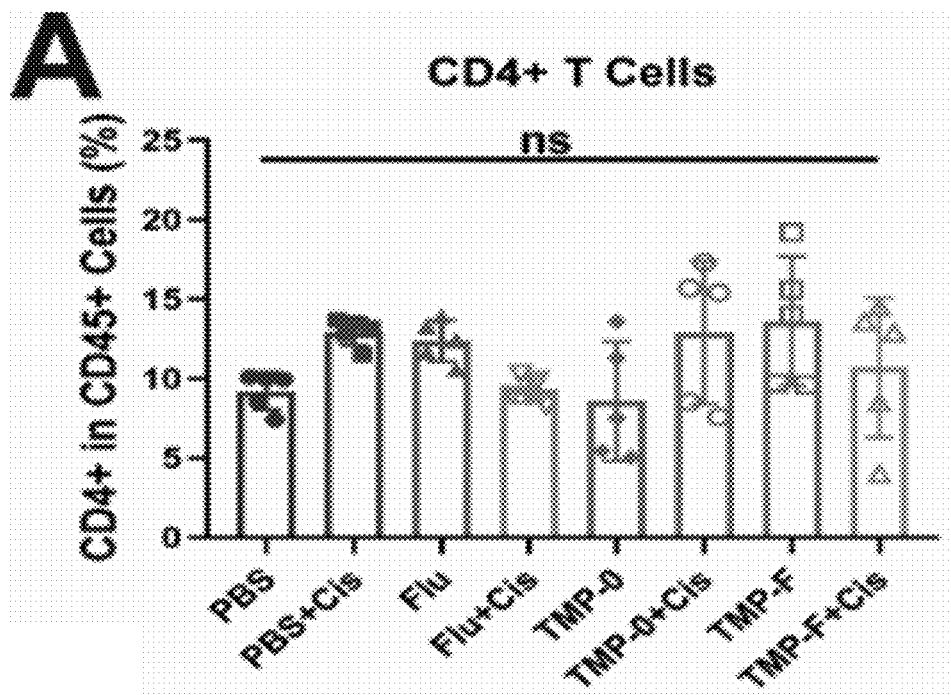
FIG. 12A is a schematic diagram of a distribution of $CD4^+$ T cells in a tumor immune microenvironment.
Figure 12B:
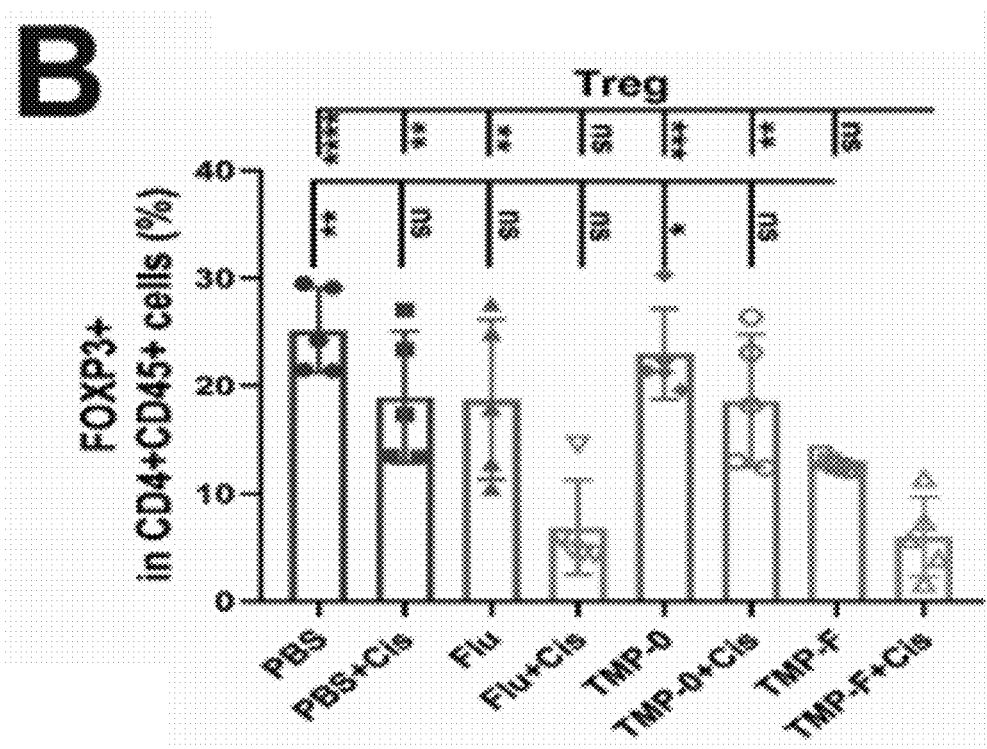
FIG. 12B is a schematic diagram of a distribution of Treg cells in the tumor immune microenvironment.
Figure 12C:
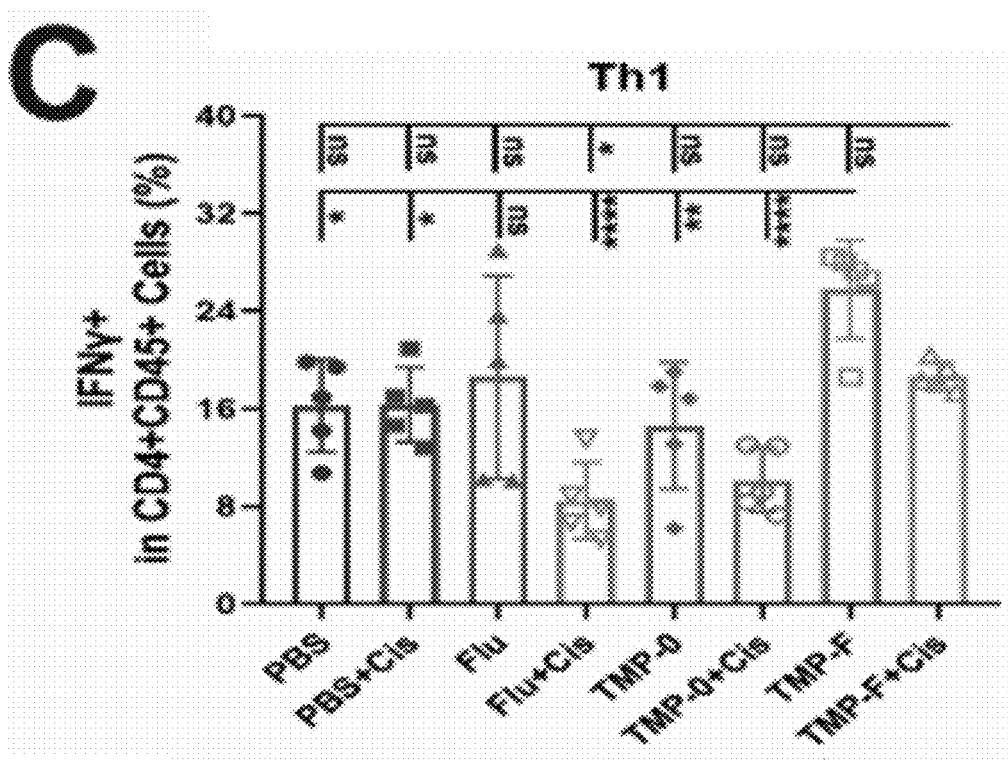
FIG. 12C is a schematic diagram of a distribution of Th1 cells in the tumor immune microenvironment.
Figure 12D:
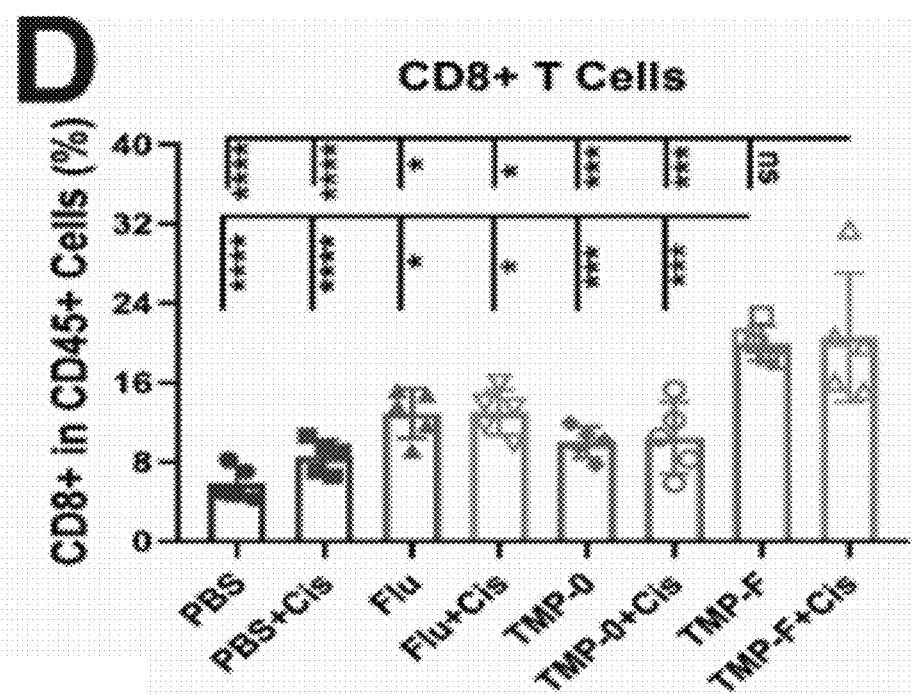
FIG. 12D is a schematic diagram of a distribution of $CD8^+$ T cells in the tumor immune microenvironment.
Figure 12E:
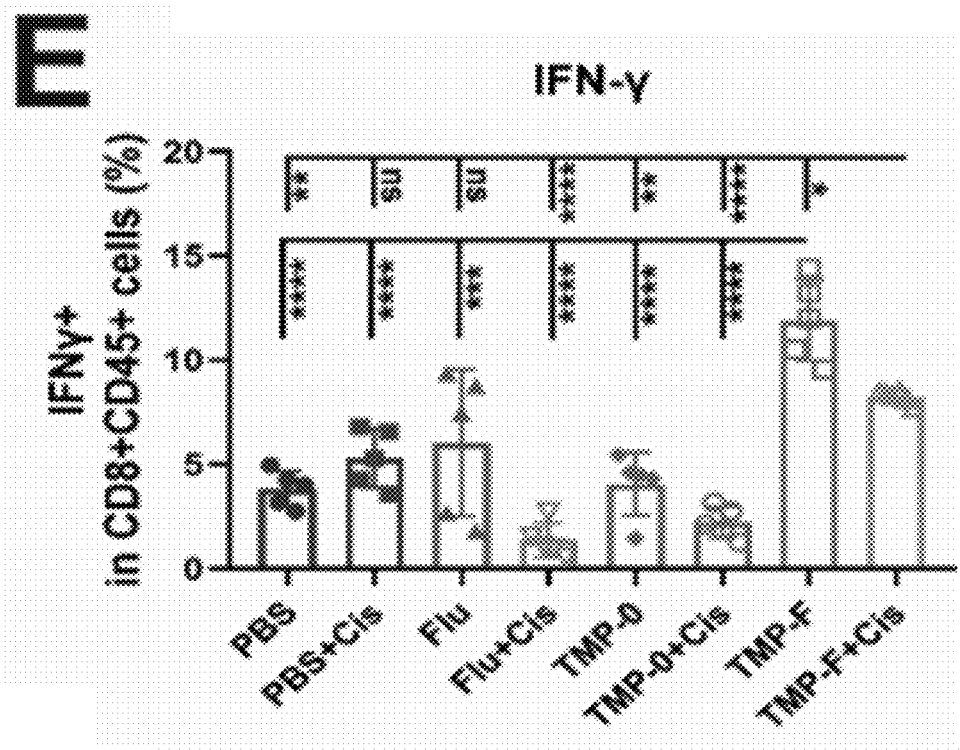
FIG. 12E is a schematic diagram of a distribution of an interferon-γ (IFN-γ) secreted by cytotoxic $CD8^+$ T cells in the tumor immune microenvironment.
Figure 12F:
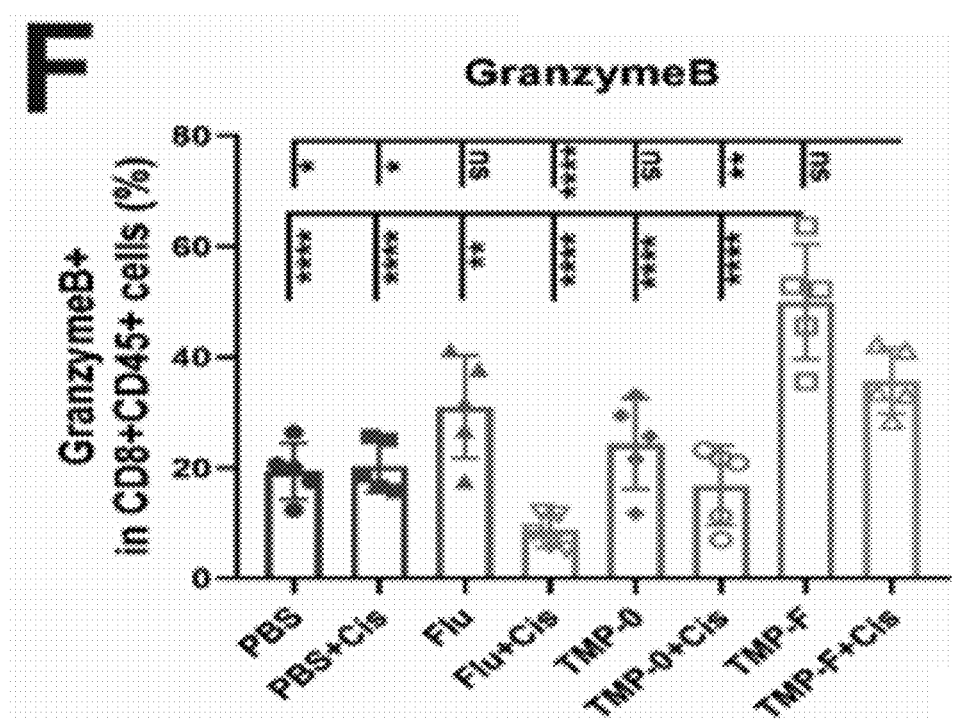
FIG. 12F is a schematic diagram of a distribution of Granzyme B secreted by the cytotoxic $CD8^+$ T cells in the tumor immune microenvironment.

5. The TMP-F Enhances Chemotherapy Efficacy and Inhibits the Lung Metastasis at the Animal Level In order to explore the anti-tumor effect of TMP-F combined with chemotherapy, two doses of cisplatin chemotherapy (Cis) are added during the intervention process. From a growth trend of the subcutaneous tumors in the mice and gross photos of naked tumors, it is known that compared with the chemotherapy alone or the TMP-F, the TMP-F combined with chemotherapy significantly inhibits tumor growth (FIGS. 9A, 9B, 10A and 10B). In addition, the lungs of mice are extracted, hematoxylin-eosin (H&E) staining is performed on the lungs of mice, and the number of lung metastatic nodules under the light microscope are observed and counted. It is concluded that compared to the PBS intervention group, the chemotherapy alone, the TMP-F, or the TMP-F combined with chemotherapy inhibits the lung metastasis (FIG. 11).

6. The TMP-F and TMP-F Combined with Chemotherapy Reshape a Tumor Immunosuppressive Microenvironment at the Animal Level
6.1 T Cells Because the TMPs carry abundant tumor antigens, impacts on the immune response related cells in the tumor microenvironment (TME) has attracted researchers' attention. Therefore, the local immune response of tumors is studied and the therapeutic mechanisms of TMP-F or TMP-F combined with chemotherapy are explored. The T cell subpopulations are tested in cellular immunity and found that in the TMP-F or the TMP-F combined with chemotherapy group, a level of immunosuppressive Treg is decreased, a distribution of helper Th1 cells assisting cellular immunity is increased, and a level of CD8$^+$ T cells is increased, along with a secretion of cytokines such as interferon γ (IFN-γ) and Granzyme B is increased, but there is no significant change in CD4$^+$ T cells among groups (FIGS. 12A to 12F). The result suggests that TMP-F and TMP-F combined with chemotherapy can mobilize the cell immune response to assist or directly kill the tumor cells.

6.2 NK Cells

Figure 13A:
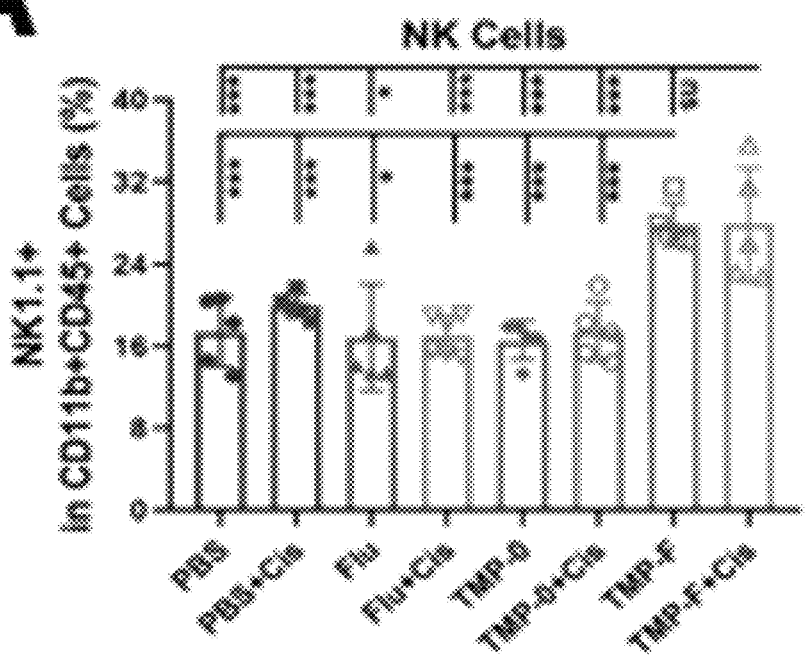
FIG. 13A is a schematic diagram of a distribution of NK cells in the tumor immune microenvironment.
Figure 13B:
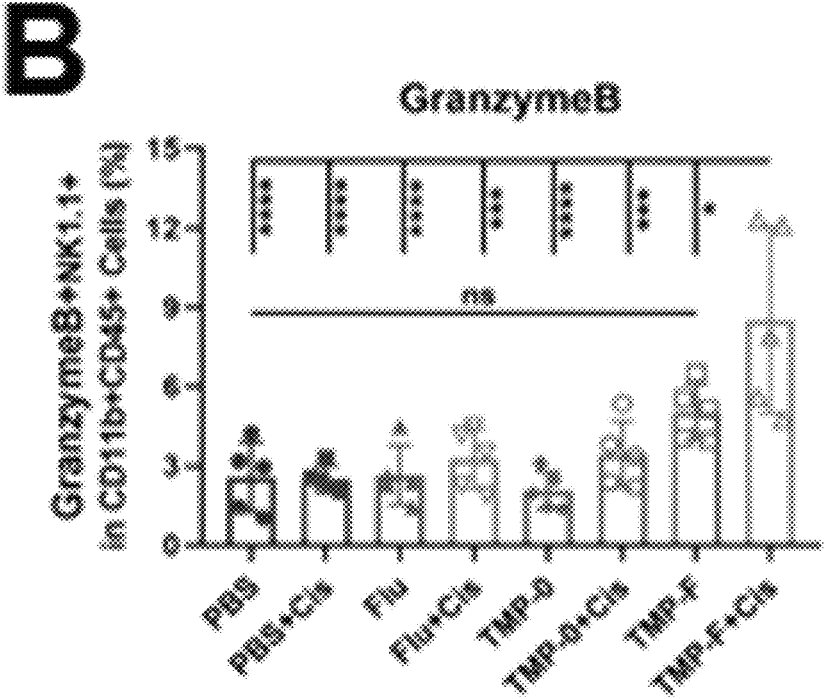
FIG. 13B is a schematic diagram of a distribution of the Granzyme B secreted by activated NK cells in the tumor immune microenvironment.
Figure 13C:
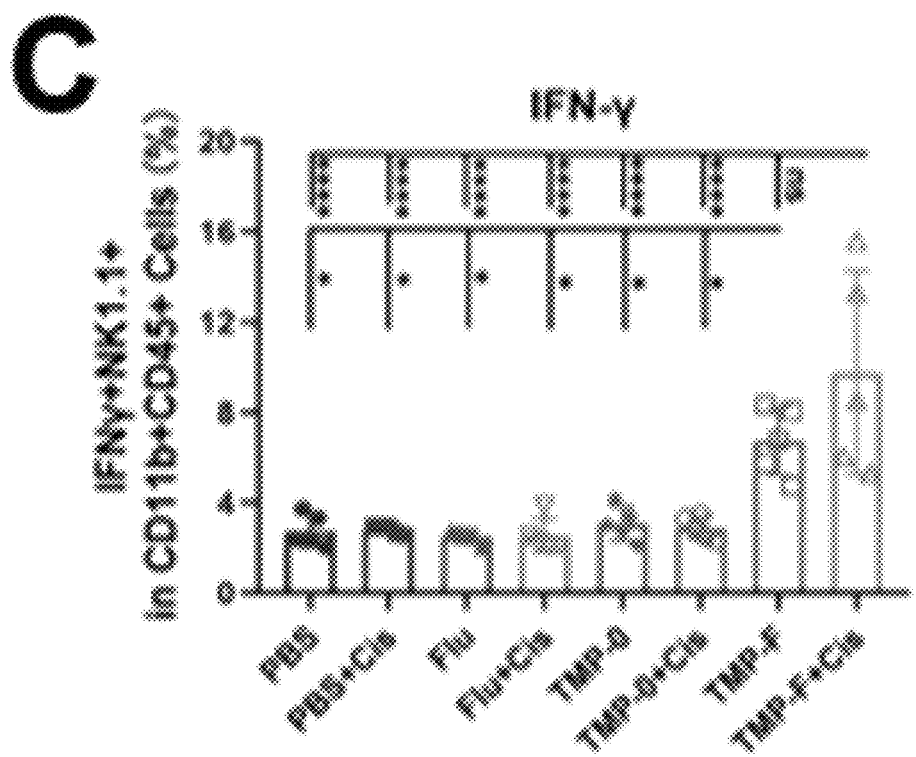
FIG. 13C is a schematic diagram of a distribution of an interferon-γ secreted by the activated NK cells in the tumor immune microenvironment.

In addition to cell immunity, the natural immune response is detected in the TME. The TMP-F and TMP-F combined with chemotherapy promote infiltration of the NK cells in tumors, and activate the NK cells to release and increase a cytokine IFN-γ with a tumor killing effect. In addition, the release of Granzyme B from the NK cells is significantly increased after the TMP-F combined with chemotherapy (FIGS. 13A, 13B and 13C).

6.3 Macrophages

Figure 14A:
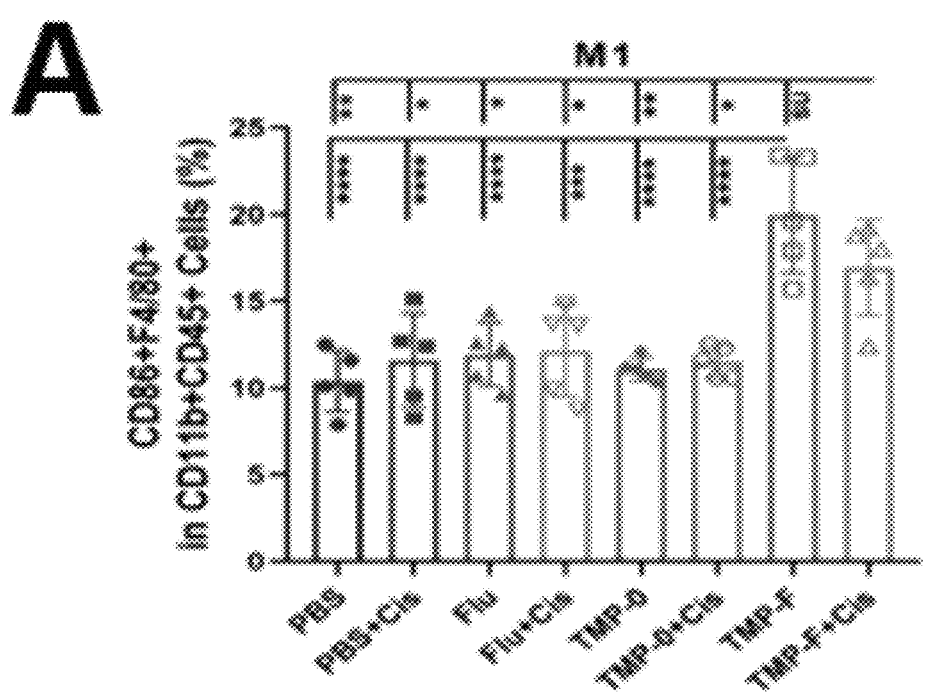
FIG. 14A is a schematic diagram of a distribution of M1 macrophages in the tumor immune microenvironment.
Figure 14B:
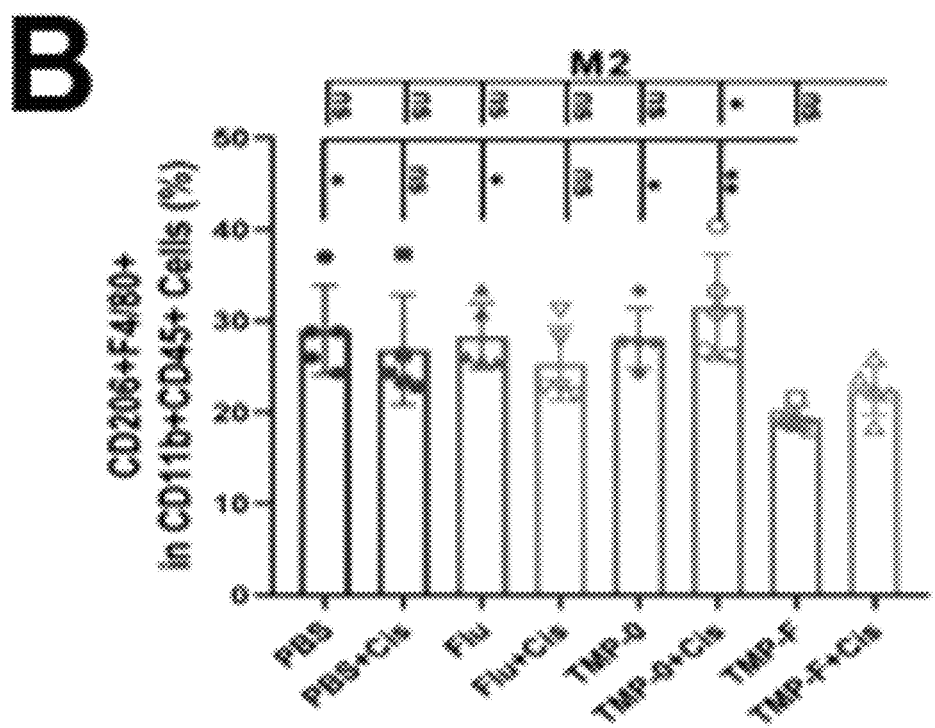
FIG. 14B is a schematic diagram of a distribution of M2 macrophages in the tumor immune microenvironment.
Figure 14C:
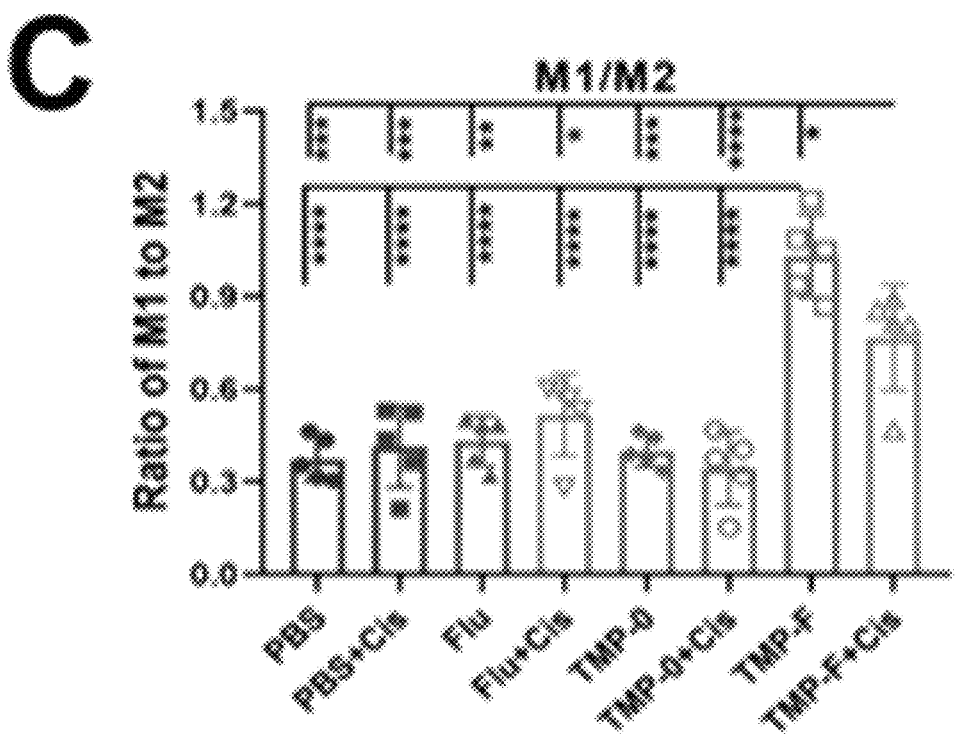
FIG. 14C is a schematic diagram of a distribution proportion of the M1 and the M2 macrophages in the tumor immune microenvironment.

Tumor M1 type macrophages are considered an anti-inflammatory type and have anti-tumor effects; and M2 type tumor macrophages are considered a pro-inflammatory type, have a tumor promoting effect. The TMP-F and the TMP-F combined with chemotherapy effectively increase the infiltration rate of the M1 type macrophages, reduce M2 type macrophages, and increase a proportion of the M1 and the M2 macrophages, indicating that the TMP-F or the TMP-F combined with chemotherapy has a potential to induce macrophage polarization from M2 to M1 type macrophages (FIGS. 14A, 14B and 14C).

From the above results of cell immunity and natural immunity, it is known that after the intervention of the TMP-F or the TMP-F combined with chemotherapy, the tumor immunosuppressive microenvironment has a big reversal, and has changed into the immune microenvironment that promotes the tumor killing.

The embodiments described above are all preferred embodiments in the disclosure, and the parts not detailed are common knowledge of those skilled in the art. A scope of a protection of the disclosure is subject to a content of claims, and any equivalent transformation based on a technical inspiration of the disclosure is within the scope of the protection of the disclosure.

What is claimed is:

1. A preparation method of a tumor microparticle encapsulating a metabolic inhibitor comprising the following steps:
   step 1, cultivating a tumor cell and adding a statin drug to a culture medium after the tumor cell grows stably;
   step 2, performing ultraviolet (UV) irradiating on the tumor cell, and then incubating the tumor cell in a cell incubator for 22~26 hours (h); and
   step 3, after the incubating, collecting cell supernatant and obtaining the tumor microparticle encapsulating the metabolic inhibitor through a gradient centrifugation.

2. The preparation method of the tumor microparticle encapsulating the metabolic inhibitor as claimed in claim 1, wherein in step 1, 0.2 millimoles per liter (mmol/L) fluvastatin as the statin drug are added to every $10^8$ numbers of the tumor cell.

3. The preparation method of the tumor microparticle encapsulating the metabolic inhibitor as claimed in claim 1, wherein a time of the UV irradiating in step 2 is 20 minutes (min).

4. The preparation method of the tumor microparticle encapsulating the metabolic inhibitor as claimed in claim 1, wherein a time of the incubating in step 2 is 24 h.

5. The tumor microparticle encapsulating the metabolic inhibitor, prepared by the method as claimed in claim 1.

6. An application method of the tumor microparticle encapsulating the metabolic inhibitor, comprising: treating a cancer by using the tumor microparticle encapsulating the metabolic inhibitor as claimed in claim 5.

7. The application method of the tumor microparticle encapsulating the metabolic inhibitor as claimed in claim 6, comprising: preparing an injection reagent by using the tumor microparticle encapsulating the metabolic inhibitor as claimed in claim 5 for inhibiting tumor growth.

* * * * *